United States Patent Office 2,969,390
Patented Jan. 24, 1961

---

2,969,390

TRIS(SUBSTITUTED CARBAMOYL) PHOSPHINES AND THE PREPARATION THEREOF

Sheldon A. Buckler, Stamford, Conn., assignor to American Cyanamid Company, New York, N.Y., a corporation of Maine No Drawing. Filed Feb. 2, 1959, Ser. No. 790,389

10 Claims. (Cl. 260—551)

The present invention relates to novel tertiary phosphines and the preparation thereof. More particularly, the instant discovery concerns the production of tris(substituted-carbamoyl) phosphines, such as tris(arylcarbamoyl) phosphines.

According to the present invention a straightforward method for preparing the above novel compounds has been discovered. Pursuant to the invention an isocyanate conforming to the formula

RNCO wherein R is a substituted or unsubstituted aryl group, or an unsubstituted, straight chain saturated alkyl group, is reacted with phosphine in the presence of a basic catalyst, such as triethylamine. The product conforms to the formula

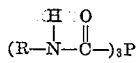

wherein R corresponds to the R in the reactant RNCO, above.

The reaction is best carried out in the presence of an inert organic solvent, such as benzene, toluene, dioxane, carbon tetrachloride, and the like. The aromatic solvents are preferred. By an inert solvent is intended an organic solvent which in the presence of the reactants and the reaction mixture, and under the reaction conditions to be further defined hereinafter, does not enter into reaction with the reactants or the reaction products to any substantial degree. Numerous other inert organic solvents are contemplated herein, such as xylene, tetrahydrofuran, diethyl ether, chlorobenzene, and the like.

While a wide range of reaction temperatures is permissible, best results are obtained at temperatures in the range of 0° C. to 140° C., preferably from about 10° C. to 100° C.

It has been discovered, according to the instant discovery, that pressures in the range of 10 to 15,000 pounds per square inch gauge, preferably 30 to 1000, are very effective in accelerating the rate of reaction. It will be apparent to the skilled chemist that as the pressure is increased the temperature at which the reaction is run may be decreased proportionately and with similar results.

The reactivity of the isocyanate is a factor in the time required for the reaction to go to completion. For example, paranitrophenyl isocyanate is substantially more reactive than phenyl isocyanate. Generally, however, reaction commences almost immediately and is noticeable by the appearance of yellow solid product which begins to precipitate. At very high temperatures and pressures complete reaction can be effected in about 15 minutes or less, depending on reactivity of the isocyanate. Usually, though, from 60 minutes to two days or more is required at moderate temperatures and pressures.

The process of the instant invention may be batch, semicontinuous or continuous.

Among the isocyanate reactants included in the formula RNCO as suitable for use herein are phenyl isocyanate, para-chlorophenyl isocyanate, 2,5-dichlorophenyl isocyanate, para-nitrophenyl isocyanate, meta-tolyl isocyanate, ortho-chlorophenyl isocyanate, meta-nitrophenyl isocyanate, naphthyl isocyanate, ethyl isocyanate, propyl isocyanate, butyl isocyanate, octyl isocyanate, undecyl isocyanate, isobutyl isocyanate, as well as other aryl isocyanates, substituted aryl isocyanates, lower-alkyl isocyanates ($C_1$–$C_{11}$), and the like.

Included in the many substituents contemplated herein for the isocyanate reactants are nitro-, lower-alkyl ($C_1$–$C_4$), chloro-, bromo-, and other similar substituents.

Among the trialkylamine catalysts suitable for the present invention are the lower-trialkyl amines, such as trimethylamine, triethylamine, tripropylamine and tributylamine.

The reactants of the present discovery are brought together in equimolar amounts, if desired. Yet, any excess of either reactant may be employed, consistent with practical chemical engineering techniques.

The novel tertiary phosphines of the instant discovery, such as the tris(arylcarbamoyl) phosphines, evolve carbon monoxide gas when treated at elevated temperatures, such as at temperatures in the range of about 140° C. to 240° C. Consequently, the novel compounds produced herein can be employed in the conventional manner as blowing agents for suitable polymeric compositions, such as polyurethanes.

The present invention will best be understood by reference to the following examples which, while detailed, are not intended to place undue limitations upon the scope of the invention:

EXAMPLE I

*Tris(phenylcarbamoyl)phosphine*

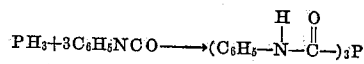

Reaction is conducted in a 250-milliliter pressure bottle connected to, and in communication with, a reservoir containing phosphine gas under 4 atmospheres pressure, the pressure bottle being mounted on a shaking device. A solution of 17.9 grams (0.15 mole) of phenyl isocyanate and 0.5 gram of triethylamine in 100 milliliters of dry benzene is placed in the pressure bottle. The space above this solution is evacuated and filled with nitrogen gas, evacuated and filled with nitrogen gas several times and finally evacuated. Phosphine gas from the reservoir is then admitted to the pressure bottle and the reaction carried out at ambient temperature (21° C.–23° C.) with shaking for four days, the pressure of 4 atmospheres being maintained by the phosphine from the reservoir. At the end of this period the space above the solution in the pressure bottle is then several times evacuated and filled with nitrogen gas. The resulting solution in the pressure bottle is then removed and concentrated to a volume of 50 milliliters and to this is added 200 milliliters of petroleum ether (boiling point 30° C.–60° C.). A solid precipitates and is collected giving 2.43 grams (13 percent by weight of theory) of the product as a white solid having a melting point of 184° C.–186° C. Recrystallization from acetic acid gives a product, tris(phenylcarbamoyl) phosphine having a melting point of 212° C.–213° C.

Analysis calculated for $C_{21}H_{18}N_3O_3P$: C, 64.45; H, 4.64; N, 10.74; P, 7.92. Found: C, 64.68; H, 4.86; N, 10.73; P, 8.10.

EXAMPLE II

*Tris(para-chlorophenylcarbamoyl)phosphine*

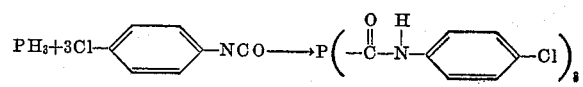

Reaction is conducted as described in Example I, above. A solution of 15.4 grams (0.1 mole) of para-chlorophenyl isocyanate and 0.5 gram of triethylamine in 100 milliliters of benzene is prepared and reacted with phosphine for 4 hours at ambient temperature (21° C.–23° C.). A crystalline solid precipitates, is collected and dried to give 9.1 grams (55 percent by weight of theory) of product having a melting point of 245° C. This material is purified by recrystallization from acetic acid.

Analysis calculated for $C_{21}H_{15}Cl_3N_3O_3P$: C, 50.98; H, 3.06; Cl, 21.50; N, 8.49; P, 6.26. Found: C, 50.94; H, 3.22; Cl, 21.23; N, 8.36; P, 6.55.

EXAMPLE III

*Tris(para-nitrophenylcarbamoyl)phosphine*

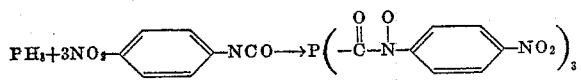

A solution of 16.4 grams (0.1 mole) of para-nitrophenyl isocyanate and 0.5 gram of triethylamine in 100 milliliters of dry benzene is prepared and reacted with phosphine as described in Example I, above, for 48 hours at ambient temperature (21° C.–23° C.). A yellow solid precipitates, is collected, washed with benzene and dried to give 17.5 grams of product (100 percent by weight of theory) having a melting point of 267° C.–270° C. Purification is accomplished by thorough washing with hot acetone.

Analysis calculated for $C_{21}H_{15}N_6O_9P$: C, 47.92; H, 2.87; P, 5.89. Found: C, 47.96; H, 2.96; P, 5.82.

EXAMPLE IV

*Tris(1-naphthylcarbamoyl)phosphine*

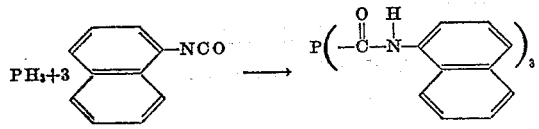

This reaction is the same as Example I, above, in every essential respect, excepting that phenyl isocyanate is substituted with an equimolar amount of 1-naphthyl isocyanate. A white solid product tris(1-naphthylcarbamoyl)phosphine is obtained by evaporation of the solvent.

EXAMPLE V

*Tris-(meta-tolylcarbamoyl)phosphine*

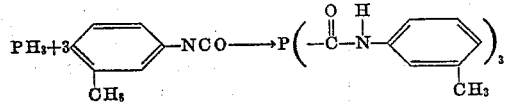

This reaction is carried out in every essential respect as in Example I, above, excepting that phenyl isocyanate is substituted with an equimolar amount of m-tolyl isocyanate and triethylamine is substituted with an equal weight of tributylamine. A white solid product tris(meta-tolylcarbamoyl)phosphine is obtained by evaporation of the solvent.

EXAMPLE VI

*Tris(ethylcarbamoyl)phosphine*

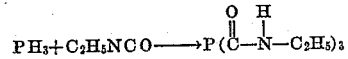

A stainless steel autoclave (300-milliliter capacity) is charged with a solution of 35.5 grams (0.5 mole) of ethyl isocyanate and 2.0 grams of tripropylamine in 100 milliliters of dry benzene. The solution is reacted for 24 hours at 100° C. under a pressure of 5000 pounds per square inch of phosphine gas. A white solid product tris(ethylcarbamoyl)phosphine is then recovered from this solution by evaporation of the solvent under reduced pressure at ambient temperature (21° C.–23° C.).

EXAMPLE VII

*Tris(octylcarbamoyl)phosphine*

The process of Example VI, above, is repeated in every essential respect with exception that the ethyl isocyanate is substituted with 77.5 grams (0.5 mole) of octyl isocyanate. A white solid product tris(octylcarbamoyl)phosphine is recovered.

While the present invention has been described in detail as to specific embodiments thereof, it is not intended that these details exert undue restrictions upon the scope of the invention, except insofar as they appear in the appended claims.

I claim:
1. The method according to claim 8 wherein the isocyanate is phenyl isocyanate.
2. The method according to claim 8 wherein the isocyanate is para-chlorophenyl isocyanate.
3. The method according to claim 8 wherein the isocyanate is para-nitrophenyl isocyanate.
4. The method according to claim 8 wherein the isocyanate is alkyl isocyanate, said alkyl moiety having from 1 to 11 carbon atoms.
5. Tris(phenylcarbamoyl)phosphine.
6. Tris(para-chlorophenylcarbamoyl)phosphine.
7. Tris(para-nitrophenylcarbamoyl)phosphine.
8. A method of preparing tertiary phosphines of the formula

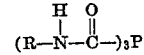

which comprises reacting phosphine and isocyanate of the formula

RNCO in the presence of a lower-trialkyl amine as a catalyst, at a temperature in the range of 0° C. to 140° C., at a pressure in the range of 10 to 15,000 pounds per square inch gauge, and in the presence of an inert organic solvent, and recovering the tris(R-carbamoyl)phosphine product, R in the above formulae being a member selected from the group consisting of alkyl having from 1 to 11 carbon atoms, naphthyl and phenyl, substituted and unsubstituted, said substituents being selected from the group consisting of nitro-, lower alkyl, and halogen.

9. The process of claim 8 wherein the temperature is in the range of about 10° C. to 100° C. and the pressure in the range of 30 to 1000 pounds per square inch gauge.

10. A tris(R-carbamoyl)phosphine of the formula

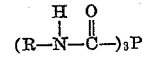

wherein R is selected from the group consisting of alkyl having from 1 to 11 carbon atoms, naphthyl and phenyl, substituted and unsubstituted, said substituents being selected from the group consisting of nitro-, lower alkyl, and halogen.

References Cited in the file of this patent

UNITED STATES PATENTS 2,853,473    Campbell et al. _____ Sept. 23, 1958

OTHER REFERENCES

Staudinger et al.: Helv. Chim. Acta, vol. 2, p. 635 (1919).

Staudinger et al.: Helv. Chim. Acta, vol. 4, p. 1887 (1921).

Staudinger et al.: Helv. Chim. Acta, vol. 5, p. 75 (1922).

UNITED STATES PATENT OFFICE
CERTIFICATION OF CORRECTION

Patent No. 2,969,390                                            January 24, 1961

Sheldon A. Buckler

It is hereby certified that error appears in the above numbered patent requiring correction and that the said Letters Patent should read as corrected below.

Column 3, lines 16 to 19, the right-hand portion of the formula should read as shown below instead of as in the patent:

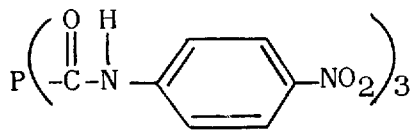

Signed and sealed this 20th day of June 1961.

(SEAL)
Attest:

ERNEST W. SWIDER                                        DAVID L. LADD
Attesting Officer                                              Commissioner of Patents